United States Patent
Kleveland et al.

(10) Patent No.: US 7,180,949 B2
(45) Date of Patent: Feb. 20, 2007

(54) HIGH-SPEED CHIP-TO-CHIP COMMUNICATION INTERFACE

(75) Inventors: Bendik Kleveland, Santa Clara, CA (US); Eric Anderson, Palo Alto, CA (US); Gunes Aybay, Los Altos, CA (US); Philip Ferolito, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 824 days.

(21) Appl. No.: 10/439,571

(22) Filed: May 16, 2003

(65) Prior Publication Data

US 2003/0236939 A1    Dec. 25, 2003

Related U.S. Application Data

(60) Provisional application No. 60/385,989, filed on Jun. 4, 2002.

(51) Int. Cl.
*H04L 27/00* (2006.01)
*H04L 25/00* (2006.01)
*H04L 25/06* (2006.01)

(52) U.S. Cl. ............. 375/256; 375/257; 375/259; 375/295; 375/316

(58) Field of Classification Search ........ 375/256–259, 375/219, 222, 295, 316, 354
See application file for complete search history.

(56) References Cited

U.S. PATENT DOCUMENTS

| | | | |
|---|---|---|---|
| 5,268,937 A | 12/1993 | Marbot | |
| 5,625,563 A | 4/1997 | Rostoker et al. | |
| 5,687,326 A | 11/1997 | Robinson | |
| 6,493,351 B1* | 12/2002 | Shideler | 370/438 |
| 6,493,394 B2* | 12/2002 | Tamura et al. | 375/257 |
| 6,522,188 B1 | 2/2003 | Poole | |
| 6,625,163 B1* | 9/2003 | Shideler et al. | 370/445 |
| 6,684,350 B1 | 1/2004 | Theodoras et al. | |
| 6,845,461 B1 | 1/2005 | Kim | |
| 6,965,299 B1* | 11/2005 | Dally et al. | 340/14.6 |
| 2002/0073255 A1 | 6/2002 | Davidson et al. | |

\* cited by examiner

*Primary Examiner*—Tesfaldet Bocure (57) ABSTRACT

A high-speed parallel interface for communicating data between integrated circuits is disclosed. The interface is implemented by a transmitter and receiver pair and a single-ended parallel interconnect bus coupling to the transmitter and receiver pair. As opposed to transmitting small swing signals over differential signal lines, the transmitter transmits data to the receiver at full swing over the single-ended parallel interconnect bus. The invention can be implemented with simple CMOS circuitry that does not consume large die area. Accordingly, many link interfaces can be implemented on a single chip to provide a large data bandwidth.

25 Claims, 11 Drawing Sheets

FIG. 13 bit0  010010100001101001101101110100110010101010100110001110100 0...
bit1  110000111111100110100100110011001100010000010110110110111101110 0...
bit2  111101111000101010010101000010010011000001001010101110001110010 0...
bit3  110100110011000100010000010101011001100100010010010101100 0...
bit4  101111010101110001110000010011001101010010010011100010101010000110 0...
bit5  111111001001001110011000101010101101110101110110101001110 1...
bit6  110001101011000100100000100000010110101010001001101111000101110011110 0...
bit7  000001110100010100001100111100001010001010100111011001111000101 0...
bit8  010111110001010101111110011010101000011001101010010010010101 0...
bit9  010010101101110011011001010001111110011010011101111100001101 0...

HIGH-SPEED CHIP-TO-CHIP COMMUNICATION INTERFACE

CROSS-REFERENCE TO RELATED APPLICATION

This application is entitled to the benefit of provisional Patent Application Ser. No. 60/385,989, filed Jun. 4, 2002, and is related to co-pending non-provisional Patent Application entitled "HIGH-SPEED CHIP-TO-CHIP COMMUNICATION INTERFACE WITH SIGNAL TRACE ROUTING AND PHASE OFFSET DETECTION", Serial Number (TBD), filed (TBD), Attorney Docket No. RSTN-028, both of which are hereby incorporated by reference.

FIELD OF THE INVENTION

The invention related generally to a high-speed chip-to-chip communication interface.

BACKGROUND OF THE INVENTION

A few years ago, a small number of people accessed primarily text-based information through the Internet. Today, motion video and sound combined with a huge increase in users have pushed the internet infrastructure and the performance of communications equipment to the limit. The explosive demands from the Internet are driving the need for higher speed integrated circuits. As the speed of integrated circuits increases, higher bandwidth buses interconnecting the integrated circuits are needed.

The traditional ways to increase the bandwidth of a bus are to increase bus width and bus clock frequency. Increasing bus width is effective to a point. But eventually, this solution runs into the problem of requiring too many pins. Pins add cost: pins take board area, increase package costs and size, increase test costs and affect electrical performance. Increasing bus width also makes length-matching signal traces, which is required in many high performance systems, more difficult.

Increasing bus clock frequency is effective but only to a point beyond which it becomes challenging to support reliable data transfer using standard printed circuit board (PCB) technology and standard manufacturing processes. For instance, high frequency clock chips are expensive and difficult to build, and there is more electrical loss on the boards interconnecting the chips. Other electromagnetic problems such as cross-talk are more likely to materially affect signal transmission at very high frequency.

In some electronics systems, differential signaling technologies (e.g., differential LVDS) are used to communicate data between integrated circuits. Differential signaling technologies typically require complex circuitry that consumes large die areas and large amounts of power. For example, an implementation of a differential LVDS link can require $6.2 \times 10^6$ $\mu m^2$ of die area and consume more than 1.7 Watts of power. Furthermore, differential signaling technologies are difficult to implement because they often require one or more Phase-Locked Loops (PLL) or Delay-Locked Loops (DLL) as well as some additional complex analog circuits. In addition, differential signaling technologies require careful isolation because they tend to be sensitive to core switching noise.

Accordingly, what is needed is a high speed interconnect between integrated circuits that does not require a high pin count, large die areas and large amounts of power. What is further needed is a high speed interconnect that can be implemented using standard PCB technology and standard manufacturing processes.

SUMMARY OF THE INVENTION

An embodiment of the invention is a high-speed parallel interface for communicating data between integrated circuits. In this embodiment, the interface is implemented by a transmitter and receiver pair coupled to a single-ended parallel interconnect bus on which data is transmitted at full-swing.

In one embodiment, the transmitter includes a transmitter controller and a transmitter interface circuit. Likewise, the receiver includes a receiver controller and a receiver interface circuit. Logic circuits feed data to the transmitter controller synchronously with an internal clock. The transmitter interface circuit, controlled by the transmitter controller, interleaves the data and provides the interleaved data to the interconnect bus synchronously with transitions of a bus clock. The receiver interface circuit, controlled by the receiver controller, captures data from the interconnect bus, de-interleaves the captured data and resynchronizes the data to an internal clock of the receiver. To the logic feeding the transmitter and logic getting data from the receiver, the interconnect of the present embodiment appears to be simple digital pipeline where latency is dependent on the length of the signal traces connecting the transmitter and the receiver.

In one embodiment, the transmitter accepts a 32-bit data word every clock cycle, interleaves this data and outputs the interleaved data to a single-ended 8-bit data bus along with a bus clock running at twice the frequency of the transmitter's internal clock. In this embodiment, the receiver captures the arriving data with the provided bus clock (one 8-bit data word on every edge of the provided bus clock) and uses a FIFO (First-In-First-Out buffer) to resynchronize the captured data with the receiver's internal clock. The receiver then transfers the resynchronized 32-bit data to logic circuits interfacing to the receiver.

In another embodiment of the invention, the transmitter accepts a 40-bit data word every clock cycle, interleaves this data and outputs the interleaved data to a single-ended 10-bit data bus along with a bus clock running at twice the frequency of the transmitter's internal clock. The receiver captures 10-bit data from the 10-bit data bus with the provided bus clock, de-interleaves the data, resynchronizes the data and outputs 40-bit data to logic circuits interfacing to the receiver.

In one embodiment, the bus clock signal has a frequency of approximately 333 Mhz. The internal clock signals of the transmitter and the receiver have a frequency of approximately 167 Mhz and are preferably generated off the same frequency source.

Data latency is dependent on the length of the signal traces of the interconnect bus. In one embodiment, where the maximum length of the signal traces is 30 inches, the minimum latency is seven 167 Mhz clock cycles and the maximum latency is eight 167 Mhz clock cycles.

Embodiments of the invention are easily scalable. A single integrated circuit can implement multiple transmitters and multiple receivers. In one embodiment of the invention, sixteen transmitters and sixteen receivers, which can provide more than 25 Gb/s of bandwidth capacity, are implemented on a single chip.

Embodiments of the invention do not require exotic PCB (Printed Circuit Board) materials or expensive manufacturing steps. Rather, commonly available PCB materials and common processing steps can be used to manufacture the interconnect bus.

In one preferred embodiment of the invention, properties of the interconnect include, but not limited to, the following:
Source synchronous;
Quad data rate;
8-bit or 10-bit parallel buses;
Uses widely available 1.8V 50 ohm controlled impedance CMOS drivers;
Isolated power for the receiver's input buffers;
Clock and Data offset through board signal trace length difference;
Analog devices not required at the Receiver;
Low power consumption (0.3W for transferring data at 13 Gbit/s); and
Low bit error rate.

Other aspects and advantages of the invention will become apparent from the following detailed description, taken in conjunction with the accompanying drawings, illustrating by way of example the principles of the invention.

DETAILED DESCRIPTION OF THE INVENTION

Figure 1:
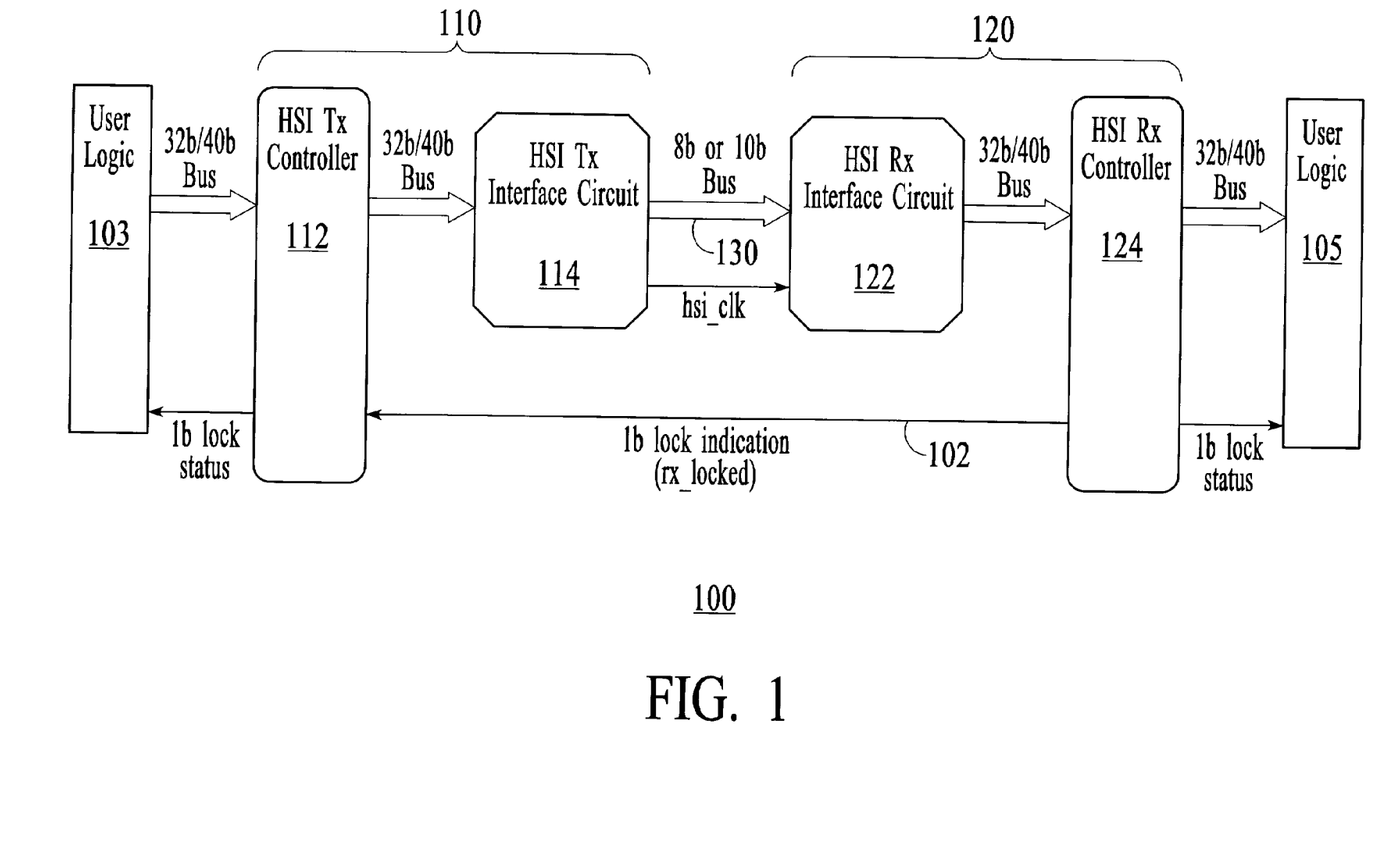
FIG. 1 is a block diagram illustrating a block diagram of a High-Speed Interconnect (HSI) link for communicating data between chips in accordance with one embodiment of the invention.

FIG. 1 is a block diagram illustrating a High-Speed Interconnect (HSI) link 100 for communicating data between chips in accordance with one embodiment of the invention. The HSI link 100 includes a transmitter 110 and a receiver 120 connected by an interconnect bus 130. In one embodiment, the transmitter 110 and the receiver 120 are implemented within separate chips (not shown) but within a same backplane of a high-speed electronic communication system. As shown, the transmitter 110 includes a HSI Tx Controller 112 and a HSI Tx Interface Circuit 114. The receiver 120 includes a HSI Rx Interface Circuit 122 and a HSI Rx Controller 124. The HSI Tx Interface Circuit 114 and the HSI Rx Interface Circuit 122 are preferably implemented as hard macro cells (or "hardmacs"), and the HSI Tx Controller 112 and the HSI Rx Controller 124 are preferably synthesizable. Also shown in FIG. 1 is user logic 103 that feeds data to the HSI Tx Controller 112 and user logic 105 that receives data from the HSI Rx Controller 124.

In the embodiment illustrated in FIG. 1, the HSI link 100 is operable in "set up" mode and a "normal mode." In "normal" mode, logic circuits feed a 40-bit wide data stream that is synchronous with an internal clock of the transmitter 110 to the HSI Tx Controller 112. The controller 112 then passes the data to the HSI Tx Interface Circuit 114. The HSI Tx Interface Circuit 114, controlled by the HSI Tx Controller 112, interleaves the 40-bit wide data stream into a 10-bit wide data stream and provides the 10-bit wide data stream to the interconnect bus 130 at every transition of a bus clock hsi_clk. The HSI Rx Interface Circuit 122, controlled by the HSI Rx Controller 124, captures the 10-bit wide data stream from the interconnect bus 130, de-interleaves the captured data into a 40-bit wide data stream, and resynchronizes the data to an internal clock of the receiver 120. The de-interleaved and resynchronized data is then passed to the HSI Rx Controller 124 and subsequently to user logic 105. To the user logic 103 and 105, the HSI link 100 appears to be a simple digital pipeline.

In the "set up" mode, operations of the transmitter 110 and the receiver 120 are similar to those in the "normal" mode. However, the 40-bit wide data stream is generated by the HSI Tx Controller 112. In particular, the HSI Tx Controller 112 generates special patterns for initialization purposes such as "bit-lane mapping" and/or clock phase relationship determination. The HSI Rx Controller 124 does not pass received data to the user logic 105. Rather, the HSI Rx Controller 124 scans for "signatures" in the received data and identifies a particular "bit-lane" correspondence and/or clock phase relationship associated with the detected signature. Operations of the "set up" mode will be described in greater detail below.

With reference still to FIG. 1, the bus clock, hsi_clk, runs at approximately 333 Mhz, and the internal clocks of the transmitter 110 and receiver 120 run at approximately 167 Mhz. The bus clock hsi_clk is preferably generated by the transmitter 110. The transmitter 110 and the receiver 120 both preferably operate off the same frequency source to generate the 167 Mhz clocks. Furthermore, in this embodiment, the HSI link 100 transfers 10-bit data on every transition of the 333 Mhz bus clock. As the result the data rate of the HSI link 100 is approximately 6.6 Gb/s.

In another embodiment, the transmitter 110 generates or accepts a 32-bit wide data stream synchronously with the transmitter 110's internal clock. The interconnect bus 130 communicates a 8-bit wide data stream synchronously with transitions of the bus clock hsi_clk. And, the receiver 120 delivers a 32-bit wide data stream to user logic 105 synchronously with an internal clock of the receiver 120.

In accordance with the invention, the HSI link 100 communicates non-differential signals over single-ended signal traces of the interconnect bus 130. As used herein, a differential signal is carried on two conductors, and the signal value is the difference between the individual voltages on each conductor. A non-differential signal, on the other hand, is carried on one conductor, and the signal value is the difference between the voltage on the conductor and a ground voltage. Furthermore, in one embodiment, data signals are transmitted across the interconnect bus 130 at full-swing. As used herein, a "full swing" signal swings approximately between a supply voltage (Vdd or Vddq) and zero volts (ground), and "small swing" signals have small amplitudes relative to the supply voltage levels. For example, for CMOS circuits wherein the supply voltage Vdd is equal to 1.8 volts and system ground VSS is equal to zero volts, a "full swing" signal swings approximately between 1.8 volts and zero volts. A "small swing" signal may have an amplitude of 0.2 volts that swings between a low of 0.8 volt and a high of 1.0 volt.

With reference again to the embodiment illustrated in FIG. 1, data latency is dependent on the length of the signal traces of the interconnect bus 130. In one embodiment where the bus clock runs at approximately 333 Mhz and where the maximum length of the signal traces is 30 inches, the minimum latency is seven 167 Mhz clock cycles and the maximum latency is eight 167 Mhz clock cycles.

Figure 2:
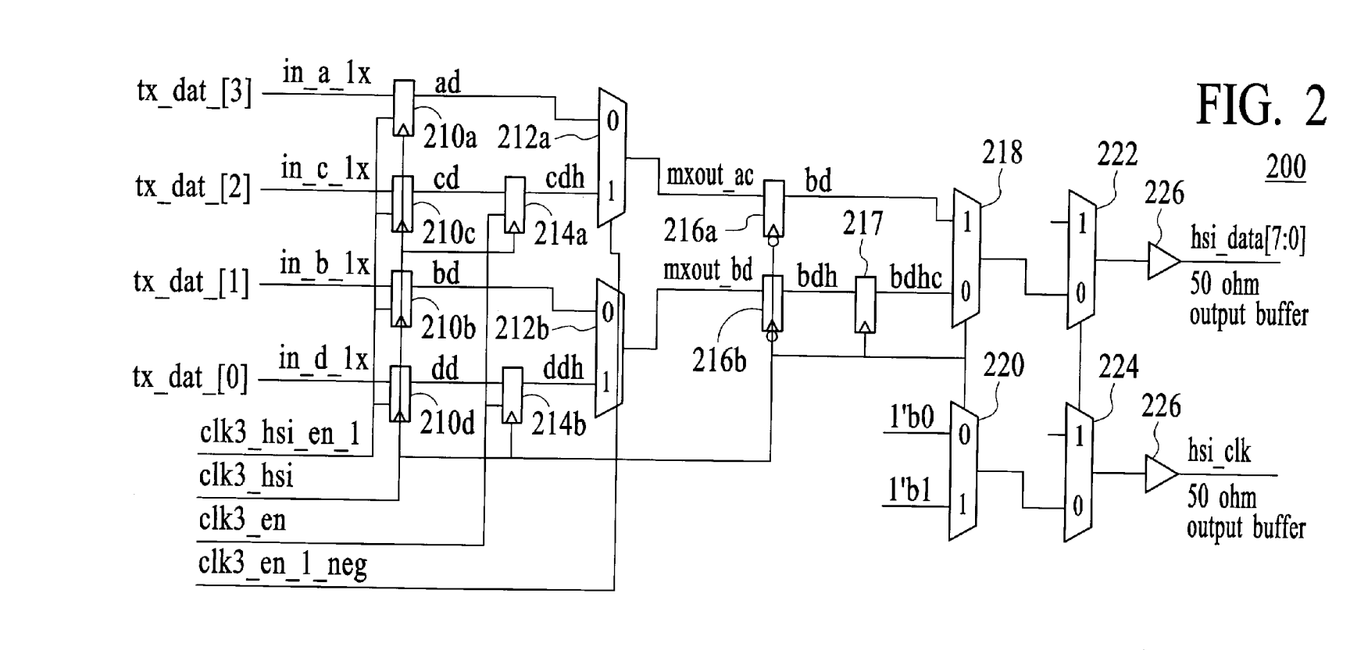
FIG. 2 is a block diagram illustrating part of the HSI Tx Interface Circuit of FIG. 1, in accordance with one embodiment of the invention.
Figure 3:
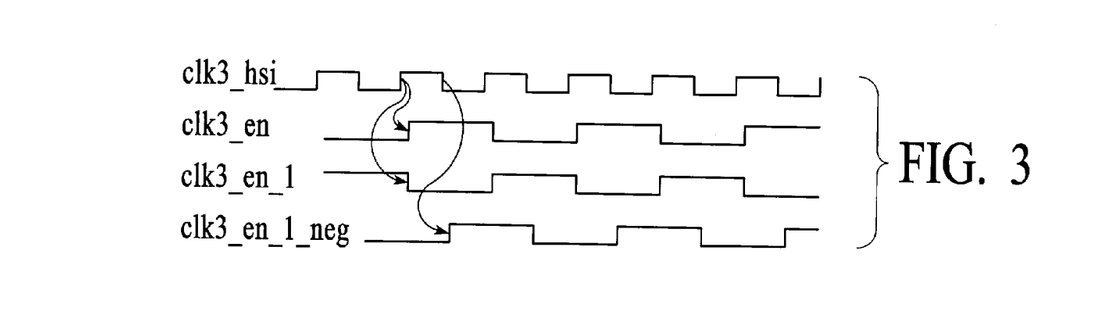
FIG. 3 is a timing diagram showing the clock signals of the circuit of FIG. 2, in accordance with one embodiment of the invention.

FIG. 2 is a block diagram illustrating part of a circuit 200 within the HSI Tx Interface Circuit 114. In this embodiment of the invention, the circuit 200 uses four control/clock signals: clk3_hsi, clk3_en, clk3_en_1, and clk3_en_1_neg, as illustrated in FIG. 3. In one embodiment, the signal clk3_hsi is a 333 Mhz clock signal. The signals clk3_en, clk3_en_1 and clk3_en_1_neg are 167 Mhz clock signal. Preferably, the signals clk3_en, clk3_en_1 and clk3_en_1_neg are generated off clk3_hsi.

The circuit 200 has four inputs (in_a_1x, in_b_1x, in_c_1x, in_d_1x) coupled to the HSI Tx Controller 112 for receiving four data streams: tx_data[0], tx_data[1], tx_data[2] and tx_data[3]. The data streams tx_data[3], tx_data[1], tx_data[2] and tx_data[0] are synchronous with an internal clock of the HSI Tx Controller 112, which has half the frequency of clk3_hsi. Data latches 210a–210d, which are synchronous with clk3_hsi, receive the data streams and output them to multiplexers ("muxes") 212a–212b directly or through data latches 214a–214b. Specifically, the outputs of data latches 210a and 210b are connected to one input of muxes 212a–212b, and the outputs of data latches 210c and 210d are connected to the muxes 212a–212b through data latches 214a–214b. Thus, data from data latches 210c–210d reaches muxes 212a–212b one clock cycle after data from data latches 210a–210b.

The muxes 212a–212b are controlled by clk_en_1_neg. When clk_en_1_neg is at logic "0", outputs from data latches 210a–210b are selected. When clk_en_1_neg is at logic "1", outputs from the data latches 210c–210d are selected. As shown in FIG. 3, clk_en_1_neg has a cycle that is twice as long as that of clk3_hsi. During one half the clk_en_1_neg cycle, muxes 212a–212b will output bits from tx_data[3] and tx_data[1], respectively. During the other half of the clk_en_1_neg cycle, muxes 212a–212b will output bits from tx_data[2] and tx_data[0], respectively.

Outputs of the muxes 212a–212b are connected to data latches 216a–216b, which are synchronous to falling transitions of clk3_hsi. Output of the data latch 216a is connected directly to the mux 218. Output of the data latch 216b is connected to the mux 218 through another data latch 217, which is synchronous to clk3_hsi. The mux 218 itself is synchronous with clk3_hsi. When the clk3_hsi signal is at logic "1", the mux 218 selects the output of data latch 216a to be output. When the clk3_hsi signal is at logic "0", the mux 218 selects the output data latch 216b to be output. The result is that, over two clk3_hsi cycles, the mux 218 outputs bits from tx_data[3], tx_data[1], tx_data[2] and tx_data[0]. In other words, the HSI Tx Interface Circuit 114 interleaves data streams tx_data[3], tx_data[1], tx_data[2] and tx_data[0] into one resultant data stream. Furthermore, the resultant data stream has four times the data rate of those of the input data streams.

For manufacturing purposes, the HSI Tx Interface Circuit 114 preferably implements IEEE compliant boundary scan. Hence, the output of mux 218 is connected to an input of an optional BSCAN mux 222 for debugging purposes. The output of BSCAN mux 222 is connected to a CMOS output buffer 226. Under normal operations, mux 222 will select the output of mux 218.

The signal clk3_hsi also controls mux 220, which selects a logic "0" or a logic "1" according to the clk3_hsi signal to generate the bus clock signal hsi_clk. The output of the mux 220 is also coupled to another optional BSCAN mux 224. The output of the BSCAN mux 224 is connected to another CMOS output buffer 226. Under normal operations, mux 224 will select the output of mux 220.

In the embodiment illustrated in FIG. 2, the CMOS output buffers 226 have an impedance of 50 Ohms, matching the impedance of signal traces on commonly available printed circuit boards.

It should be noted that the circuit in FIG. 2 is configured to receive four data streams and to interleave them for output on one signal trace of the interconnect bus 130. In one embodiment where user logic 103 feeds a 40-bit wide data stream to the HSI Tx Interface Circuit 114, ten circuits similar to circuit 200 are implemented in the transmitter 110. Nine of the circuits do not have muxes 220, 224 and buffer 226 because the clock signal hsi_clk does not need to be generated ten times. Also, in this embodiment, the interconnect bus 130 has eleven signal traces, ten of which are used for communicating data and one of which for communicating the clock signal hsi_clk.

Preferably, clk3_hsi should maintain a clean 50:50 duty cycle and should be routed in a way to minimize jitter due to other signals and on chip noise. Duty cycle is important in this embodiment because data at the receiver 120 is captured using both rising and falling edges of the clock hsi_clk. Any degradation of the clk3_hsi signal will translate into less setup/hold time for data with respect to these capture edges. In one embodiment, the clk3_hsi clock signal is generated by a Phase-Locked Loop (PLL) circuit (not shown).

Figure 4:
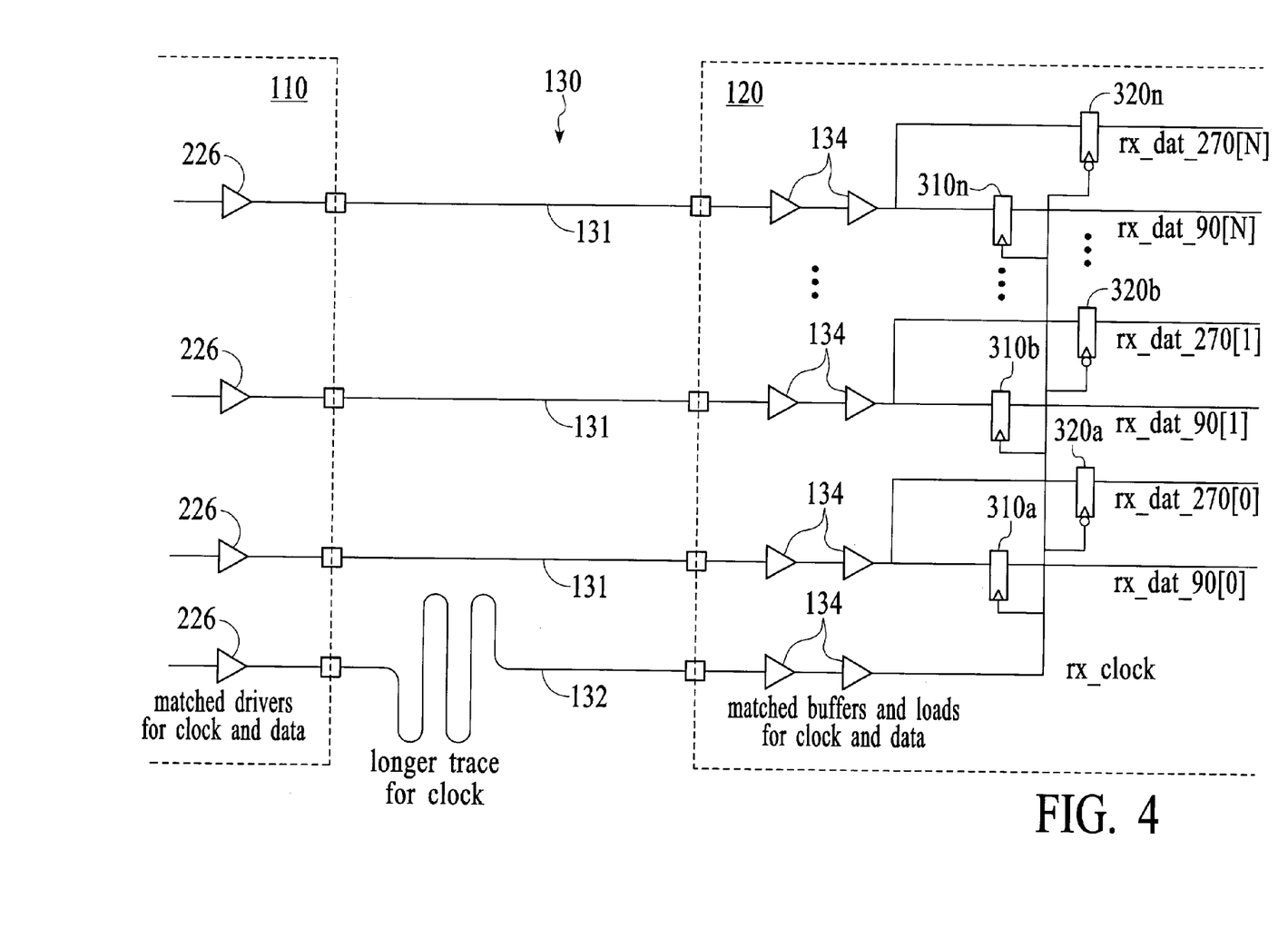
FIG. 4 is a block diagram illustrating connections among outputs of the transmitter, the interconnect bus, and the receiver according to one embodiment of the invention.

FIG. 4 is a block diagram illustrating connections among the CMOS output buffers 226 of the transmitter 110, the signal traces 131 and 132 of the interconnect bus 130, and input buffers 134 of the receiver 120. Capture flops 310a–310n and 320a–320n of the receiver 120 are also shown in FIG. 4. In one embodiment, the input buffers 134 are 1.8V CMOS buffers. The input buffers 134 do not have an explicitly controlled input reference voltage. Thus, their switching threshold can be sensitive to the on-chip digital noise inherent in any very large scale designs. To reduce this sensitivity, the input buffers 134 use isolated power.

The bus clock signal hsi_clk, which is used by the capture flops 310a–310n and 320a–320n for capturing data, is carried by the signal trace 132. Note that the clock trace 132 is longer than data traces 131 such that the bus clock signal hsi_clk is artificially delayed to produce a clock signal rx_clock. In one embodiment, rx_clock and the data are offset by at least the hold time of the capture flops 310a–310n and 320a–320n. The optimal trace length difference is dependent on the PCB materials and the characteristics (e.g., hold time) of the capture flops. In another embodiment, a DLL (Delay Locked-Loop) circuit can be used to ensure an offset between the clock and the data.

With reference still to FIG. 4, the rx_clock signal is used by capture flops 310a–310n and 320n—320n to capture incoming data. In particular, capture flops 310a–310n capture data that is synchronous with rising transitions of the rx_clock signal, and capture flops 320a–320n capture data that is synchronous with falling transitions of rx_clock.

In the present embodiment, incoming data has no fixed phase relationship with the receiver 120's internal clock(s). A bit transmitted on the rising edge of the bus clock hsi_clk can arrive on the rising edge or on a falling edge of the receiver's internal clock. In the present embodiment, whether an incoming bit arrives on a rising edge or on a falling edge of the receiver's internal clock is significant because the receiver de-interleaves the incoming data according to when the data is received with respect to the receiver's internal clock. Thus, the HSI Rx Interface Circuit 122 includes circuitry to determine the phase relationship between the data and the receiver 120's internal clock(s) such that the originally transmitted data can be accurately reassembled.

To determine the phase relationship (or phase offset) between rx_clock and an internal clock of the receiver 120, when the HSI link 100 is reset, the transmitter 110 sends a predetermined pattern to the receiver 120. The receiver 120 then compares the incoming data with patterns it expects to receive. A match will reveal the phase relationship. As an example, suppose a data stream "001100110011 . . . " is transmitted. The HSI Rx Interface Circuit 122 will receive either "001100110011 . . . " if the first bit arrives at a rising edge of the receiver 120's internal clock or "110011001100 . . . " if the first bit arrives at a falling edge of the receiver 120's internal clock. The two different received patterns will cause the HSI Rx Interface Circuit 122 to generate distinguishable outputs, which can be used by the HSI Rx Controller 124 to determine the phase relationship between the data and the receiver 120's internal clock domain. According to one embodiment of the invention, the data stream used to determine phase relationship is generated by the HSI Tx Controller 112.

Furthermore, because there is no fixed phase relationship between the data and the receiver 120's internal clock, the HSI Rx Interface Circuit 122 includes FIFO (First-In-First-Out) buffers to re-time the captured data to the receiver 120's internal clock domain.

Figure 5:
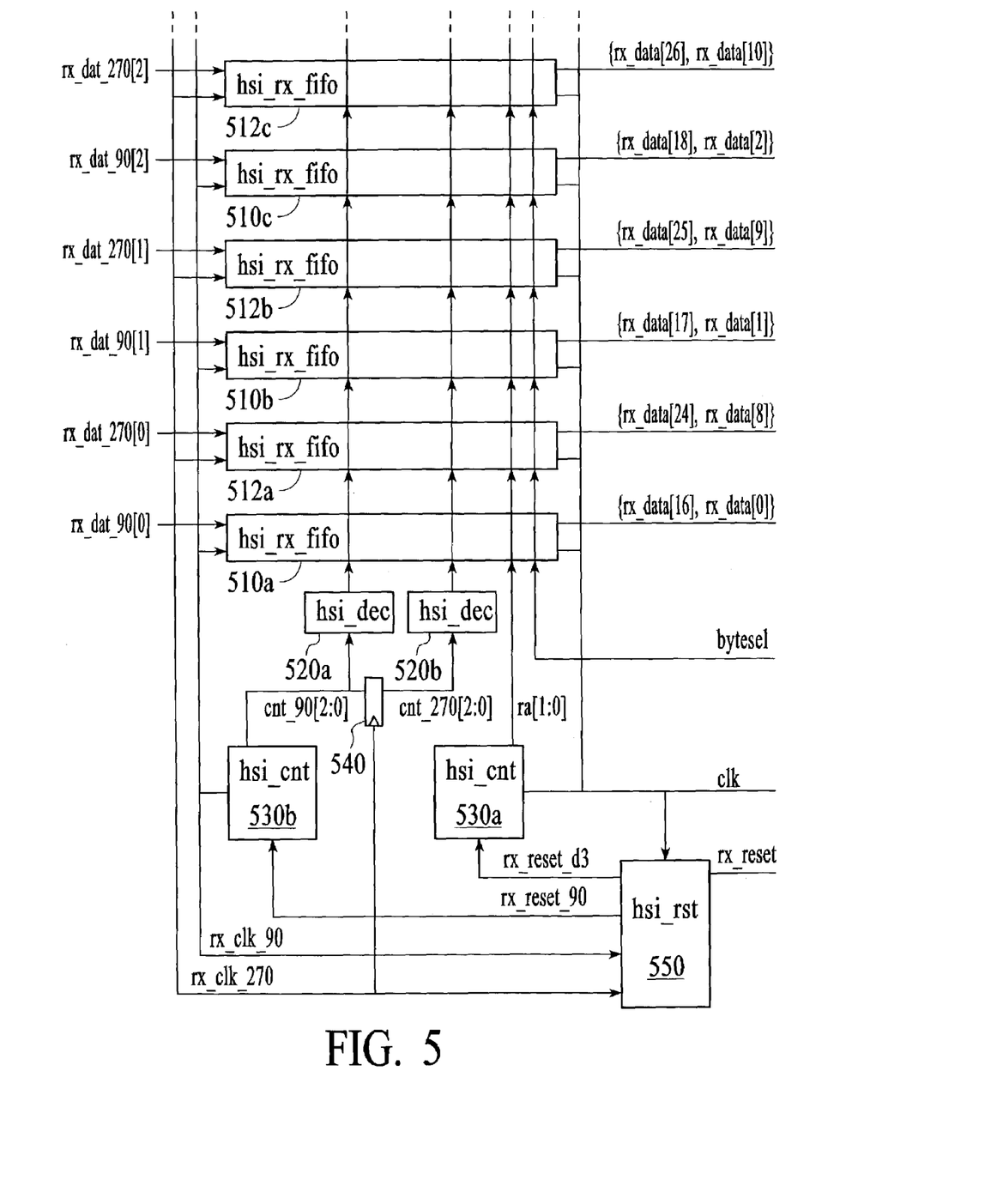
FIG. 5 is a block diagram illustrating a portion of the HSI Rx Interface Circuit of FIG. 1, in accordance with one embodiment of the invention.

FIG. 5 is a block diagram illustrating a portion of the HSI Rx Interface Circuit 124. As shown, the HSI Rx Interface Circuit 124 includes a plurality of FIFO buffers 510a–510d and 512a–512d. The FIFO buffers 510a–510d are coupled to receive data from data latches 310 (FIG. 4), and the FIFO buffers 512a–512d are coupled to receive data from data latches 320 (FIG. 4). Recall the data latches 310 are synchronous with rising transitions of rx_clock, and the data latches 320 are synchronous with falling transitions of rx_clock. Accordingly, the FIFO buffers 510a–510d receive a clock signal rx_clock_90, which is the same as rx_clock, and the FIFO buffers 512a–512d receive a clock signal rx_clock_270 that is 180° out of phase with rx_clock_90. The FIFO buffers 510a–510d are coupled to a hsi_dec decoder 520a, and the FIFO buffers 512a–512d are coupled to a hsi_dec decoder 520b. Further, the FIFO buffers 510a–510d and 512a–512d are coupled to a hsi_cnt counter 530a to receive a "ra[1:0]" signal. The FIFO buffers 510a–510d and 512a–512d output rx_data[n], where n corresponds to the number of bits of the tx_data[n] received by the HSI Tx Interface circuit 114. In FIG. 5, FIFO buffers 510a–510d and 512a–512d each output two bits of rx_data [n]. For instance, FIFO buffer 510a outputs two bits rx_data [16] and rx_data[0] on two separate output lines, and FIFO buffer 512a outputs two bits rx_data[24] and rx_data[8].

The FIFO buffers 510a–510d and 512a–512d receive a bytesel control signal from the HSI Rx Controller 124 and de-interleaves the buffered data accordingly. For instance, the bytesel control signal dictates whether the FIFO buffer 510a outputs a bit as rx_data[16] or as rx_data[0]. In the present embodiment, the bytesel control signal is generated by the HSI Rx Controller 124.

Figure 6:
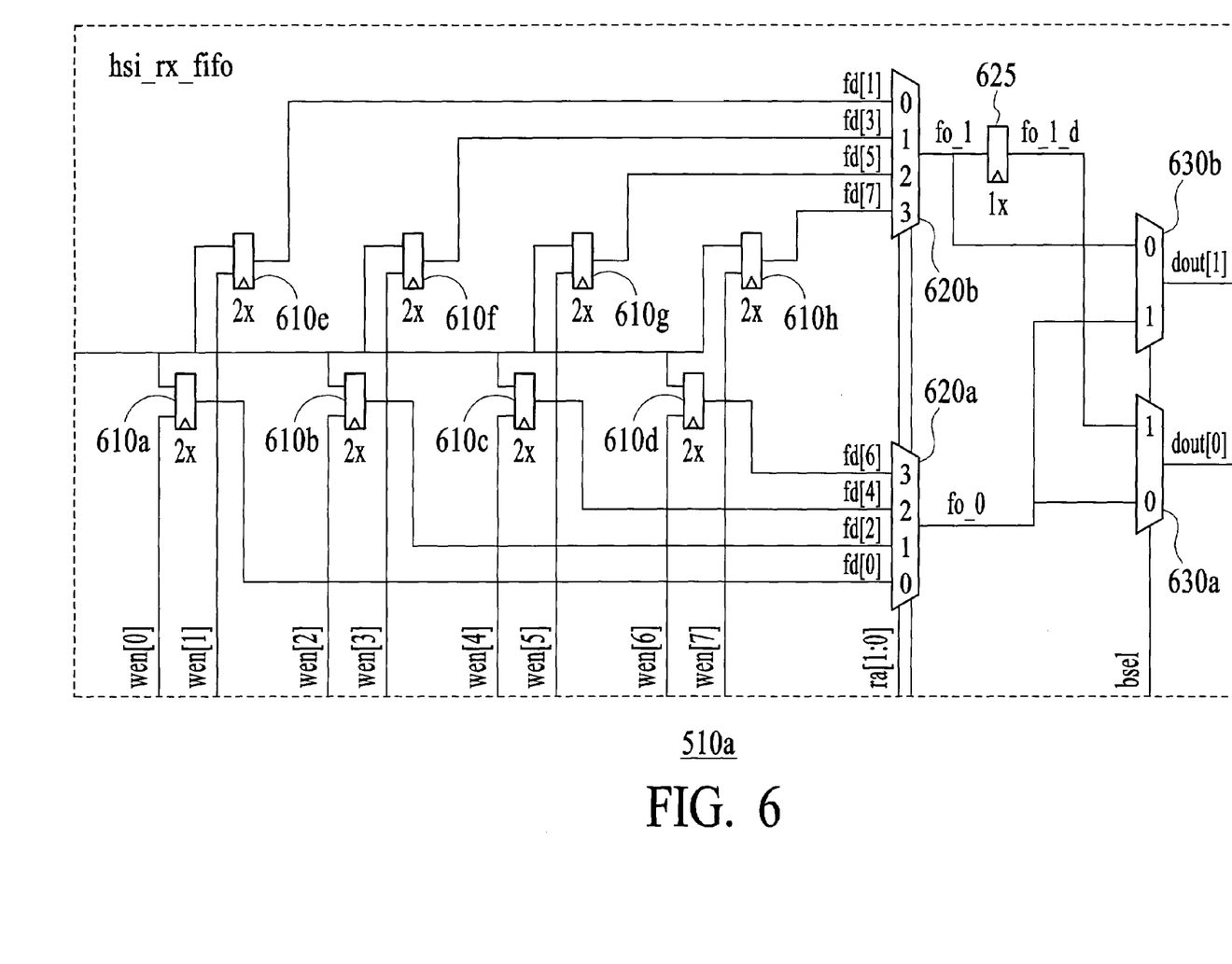
FIG. 6 is a block diagram illustrating another portion of the HSI Rx Interface Circuit of FIG. 1, in accordance with one embodiment of the invention.

Referring now to FIG. 6, there is shown a block diagram of FIFO buffer 510a. In one embodiment, all FIFO buffers of the HSI Rx Interface Circuit 122 are similarly implemented. As shown in FIG. 6, the FIFO buffer 510a includes eight data latches 610a–610h, two 4–input muxes 620a–620b, data latch 625, and two output muxes 630a–630b. Inputs of the data latches 610a–610h are coupled to the same output of one of the data latch 310a. The data latches 610a–610h receive a clock signal "2×," which is preferably identical in frequency to the rx_clock signal. Recall data latch 310a is synchronous to rx_clock. Thus, in one embodiment where rx_clock is approximately 333 Mhz, the data is entering the FIFO buffer 510a at a rate of approximately 333 Mb/s.

The data latches 610a–610h are enabled by control signals wen[7:0]. Particularly, data latches 610a–610d are write-enabled by wen[0], wen[2], wen[4] and wen[6], whereas data latches 610e–610h are write-enabled by wen [1], wen[3] wen[5] and wen[7]. In one embodiment of the invention, the data latches 610a–610h are write-enabled one at a time every 2× clock cycle. Thus, at each 2× clock cycle, data is latched into one of the data latches 610a–610h. Further, each of the data latches 610a–601h keeps stored data for a total of eight 2× clock cycles.

The outputs of the data latches 610a–610h are provided to the 4-input muxes 620a–620b, which are controlled by a signal ra[1:0]. The signal ra[1:0] selects one input of each of the muxes 620a–620b to be output. For instance, when the signal ra[1:0] is 00, the outputs of data latches 610a and 610e will be selected by the muxes 620a–620b. The signal ra[1:0] can be seen as an "output pointer" of the FIFO buffer 510a. In one embodiment, the "output pointer" selects the data latches one 2× clock cycle after they are write-enabled. In other embodiments, the "output pointer" selects the data latches two to six 2× clock cycles after they are write-enabled.

With reference still to FIG. 6, outputs from the data latches 610a–610d are connected to a "0" input of the mux 630a and to the "1" input of the mux 630b. Outputs from the data latches 610e–610h are connected to the data latch 625, whose output is connected to the "1" input of the mux 630a and the "0" input of the mux 630b. The data latch 625 is synchronous with a "1×" clock. In the present embodiment, the "1×" clock is an internal clock of the receiver 120 and has a frequency of approximately 167 Mhz. In one embodiment, the "1×" internal clock has a frequency of approximately 167 Mhz and is generated off the same source as an internal clock signal of the transmitter 110. The "2×" clock is equivalent to rx_clock and has a frequency of approximately 333 Mhz, as described above.

The muxes 630a–630b are controlled by a select signal bytesel, which is generated by the HSI Rx Controller 124. In this embodiment, the bytesel signal controls whether data stored in data latches 610a–610d is mapped to output dout[0] or dout[1]. The bytesel signal also controls whether data stored in data latches 610e–601f is mapped to output dout[0] or dout[1]. For example, when bytesel is "1", data from data latches 610a–610d is mapped to dout[1] and data from data latches 610e–610h (delayed by oen "1×" clock cycle) is mapped to dout[0]. Further, when bytesel is "0", data from data latches 610a–610d is mapped to dout[0] and data from data latches 610e–610h is mapped to dout[1]. In this way, the HSI Rx Controller 124 can adjust the phase offset between the data and the internal clock of the receiver 120 through an appropriate bytesel control signal.

Figure 7:
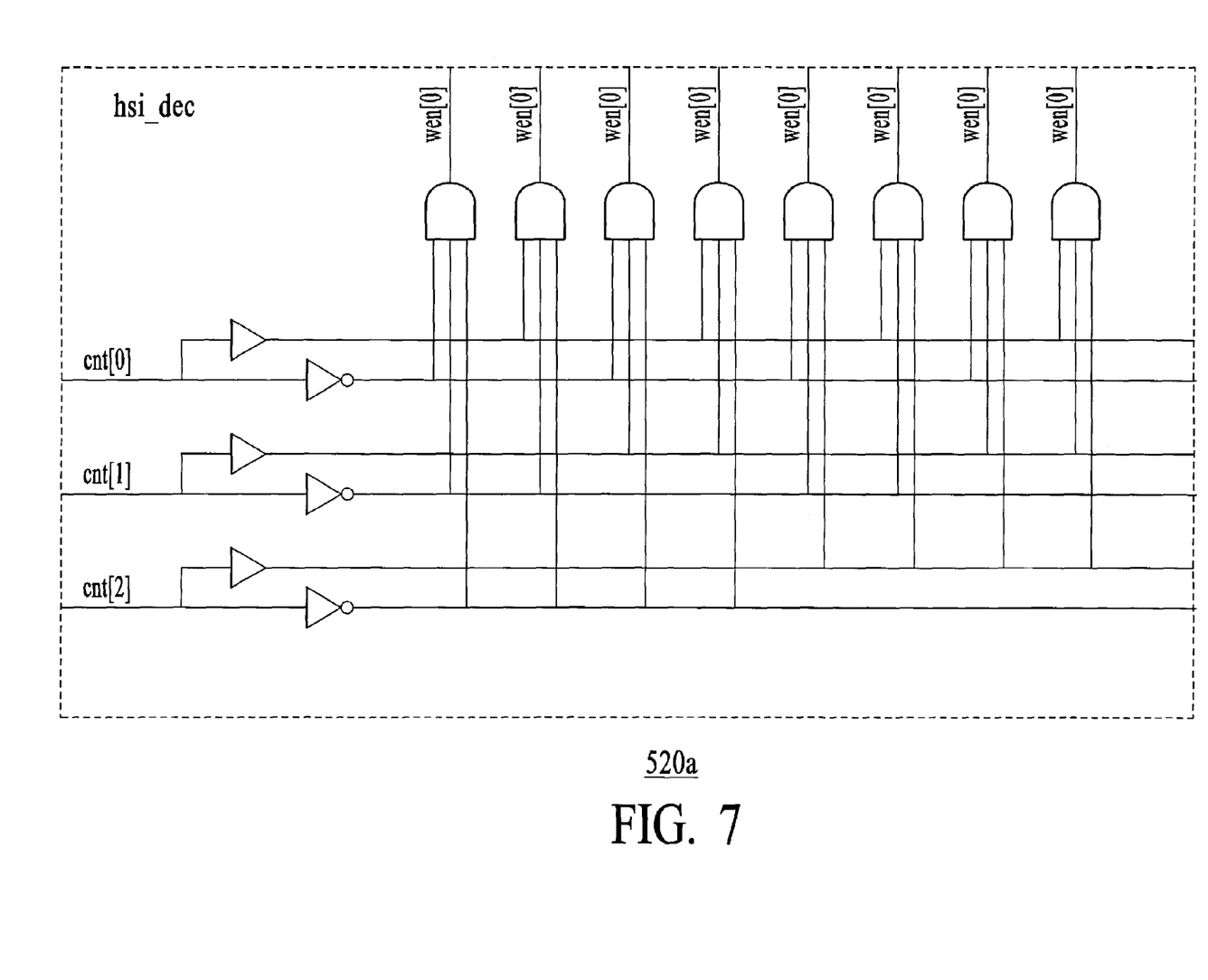
FIG. 7 is a block diagram illustrating a decoder circuit of FIG. 6, according to one embodiment of the invention.

FIG. 7 is a block diagram illustrating one embodiment of the hsi_dec decoder 520a. The hsi_dec 520b is similar to the decoder 520b. The hsi_dec decoder 520a implements logic functions described below in Table 1.

TABLE 1

| |
|---|
| Wen[0] = !Cnt[2] · !Cnt[1] · !Cnt[0] |
| Wen[1] = !Cnt[2] · !Cnt[1] · Cnt[0] |
| Wen[2] = !Cnt[2] · Cnt[1] · !Cnt[0] |
| Wen[3] = !Cnt[2] · Cnt[1] · Cnt[0] |
| Wen[4] = Cnt[2] · !Cnt[1] · !Cnt[0] |
| Wen[5] = Cnt[2] · !Cnt[1] · Cnt[0] |
| Wen[6] = Cnt[2] · Cnt[1] · !Cnt[0] |
| Wen[7] = Cnt[2] · Cnt[1] · Cnt[0] |

(Note: ! denotes complement.)

Figure 8:
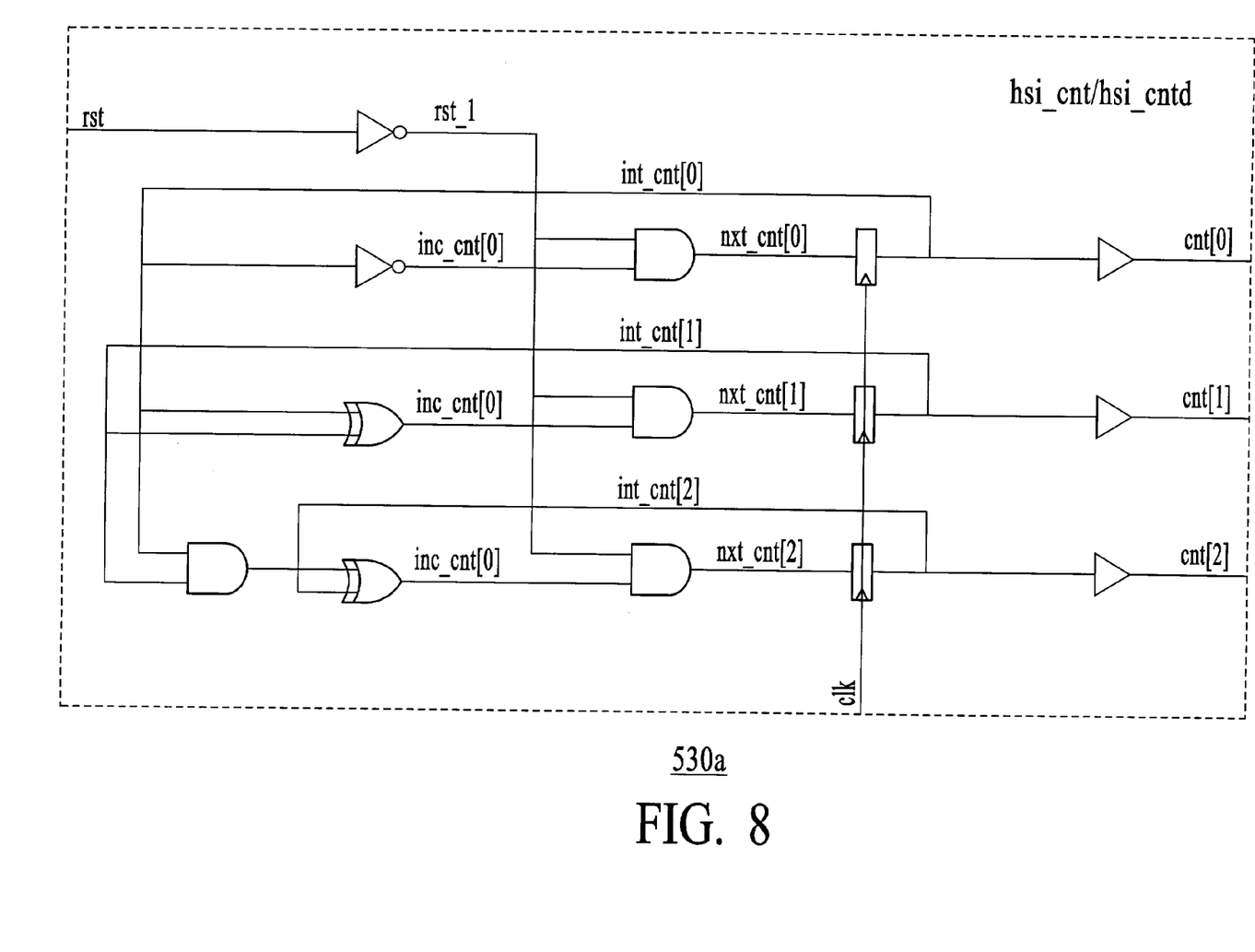
FIG. 8 is a block diagram illustrating a counter circuit of FIG. 6, according to one embodiment of the invention.

FIG. 8 is a block diagram illustrating one embodiment of the hsi_cnt counter 530a in accordance with one embodiment of the invention. Upon receiving a reset signal rx_reset_d3, the hsi_cnt counter 530a generates a cnt[2:0] output that increments consecutively and repetitively from 0 to 7. The hsi_cnt counter 530a is synchronous with a clock signal clk, which is an internal clock of the receiver 120. That is, the value of cnt[2:0] changes at every clk clock cycle. In one embodiment, clk has a frequency of approximately 167 Mhz.

Referring again to FIGS. 5 and 6, the outputs of the hsi_cnt 530a are provided to the FIFO buffers 510a–510d and 512a–512d as the signal ra[1:0]. In one embodiment, the most significant two bits of cnt[2:0] are used as the signal ra[1:0]. As a result, the 4-input muxes 620a–620b select a different pair of data latches every clk clock cycle. In other words, data is read from the FIFO buffers 510a–510c and 512a–512c using clock signal clk.

Note that the hsi_cnt counter 530b is similar to hsi_cnt counter 530a. However, hsi_cnt counter 530a is synchronous with the clock signal rx_clk_90 (FIG. 5), which has a frequency of approximately 333 Mhz. Thus, the value of cnt[2:0] changes at every rx_clk_90 clock cycle. Also note that the outputs of the hsi_cnt 530b are provided to the hsi_dec decoders 520a–520b for generating the wen[7:0] signals that in turn write-enable the appropriate data latches of the FIFO buffers 510a–510c and 512a–512c. As a result, data is written to the FIFO buffers 510a–510c and 512a–512c at rx_clk_90.

Data latches of FIFO buffers 512a–512d latch in data synchronously with the rx_clk_270 clock. Accordingly, the cnt[2:0] values generated by the hsi_cnt counter 530b pass through a data latch 540 that is synchronous with the rx_clk_270 clock before entering the hsi_dec decoder 520b.

Figure 9:
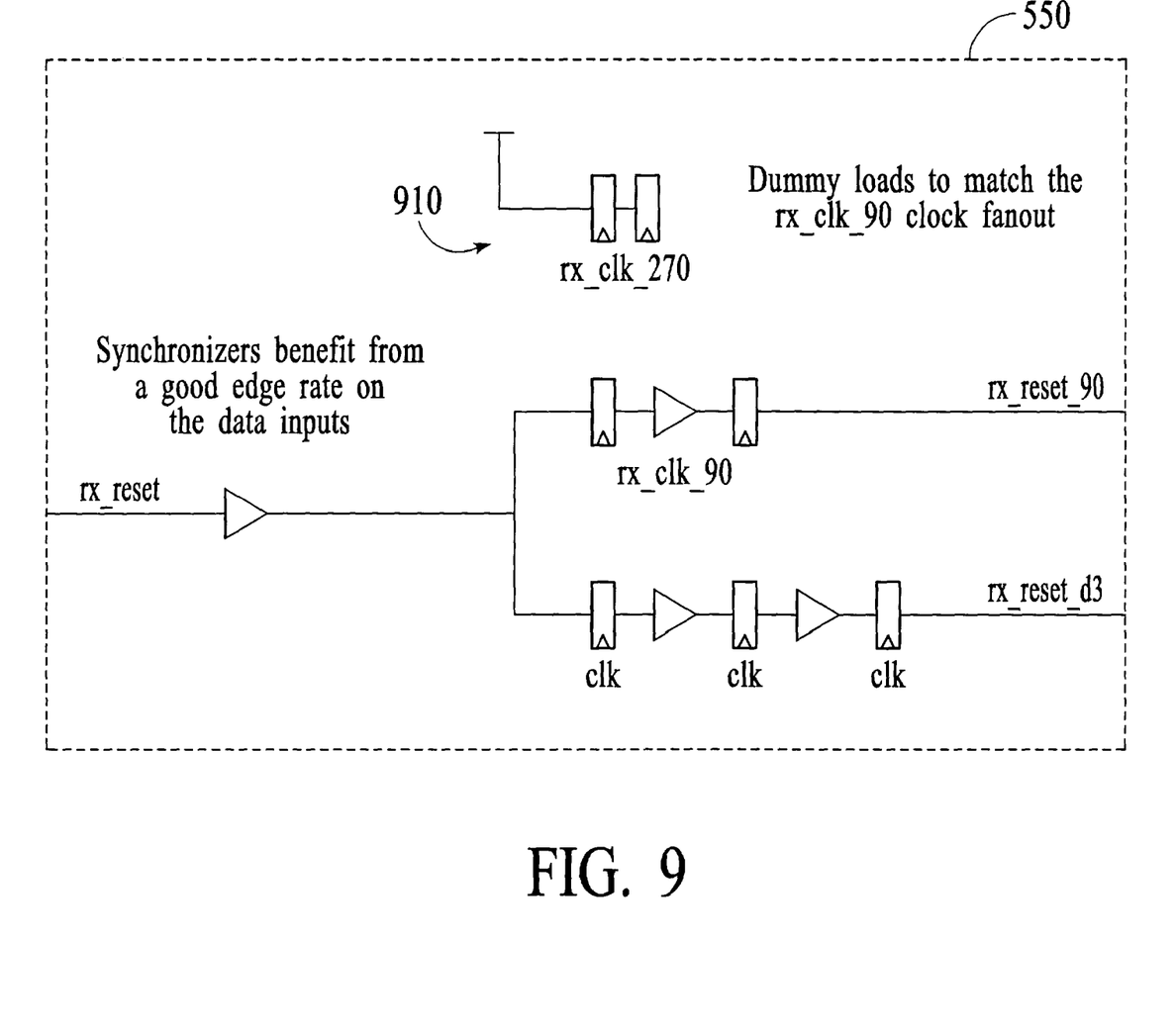
FIG. 9 is a block diagram illustrating a reset circuit of FIG. 6 according to one embodiment of the invention.

FIG. 9 is a block diagram illustrating an implementation of hsi_rst reset block 550 in accordance with one embodiment of the invention. As shown, the hsi_rst reset block 550 generates a rx_reset_90 signal and a rx_reset_d3 signal in response to a rx-reset signal generated by the HSI Rx Controller 124. The rx_reset_90 signal is synchronous with the rx_clk_90 signal, and the rx_reset_d3 signal is synchronous with clk, an internal clock of the receiver 120. Note that the hsi_rst reset block 550 further includes dummy loads 910 for matching the load of rx_clk_90.

Attention now turns to another embodiment of the invention referred herein as "bit-lane reordering". According to the embodiment where "bit-lane reordering" is allowed, output pins of the transmitter interface can be connected to any input pins of the receiver interface. In other words, the receiver can reconstruct transmitted data regardless of a routing correspondence of the parallel interconnect bus 130. In embodiments where "bit-lane reordering" is not allowed, output pins of the transmitter interface must be connected to corresponding pins of the receiver interface.

Figure 10:
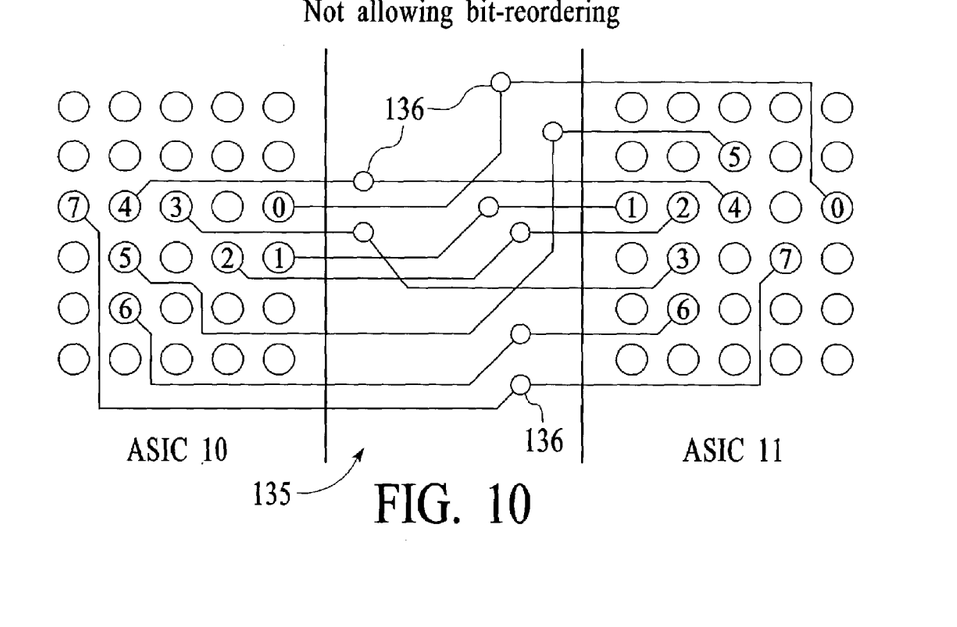
FIG. 10 illustrates signal traces connecting two ASICs according to an embodiment in which "bit-lane reordering" is not allowed.

FIG. 10 illustrates signal traces 135 connecting two ASICs 10 and 11 (Application Specific Integrated Circuits) according to an embodiment of the invention in which "bit-lane reordering" is not allowed. As shown, output pins of the ASIC 10 must be connected to corresponding input pins of the ASIC 11. In order to connect specific pins of the ASICs 10 and 12, two metal layers in the circuit board may be needed, and vias 136 for routing the signal traces 135 are also needed. The routing of the signal traces 135 takes up a significant amount of board space and routing resources. Routing of signal traces 135 through vias 136 and multiple metal layers also contributes to signal degradation because vias generally represent impedance discontinuities as routing layers can differ in electrical characteristics.

Figure 11:
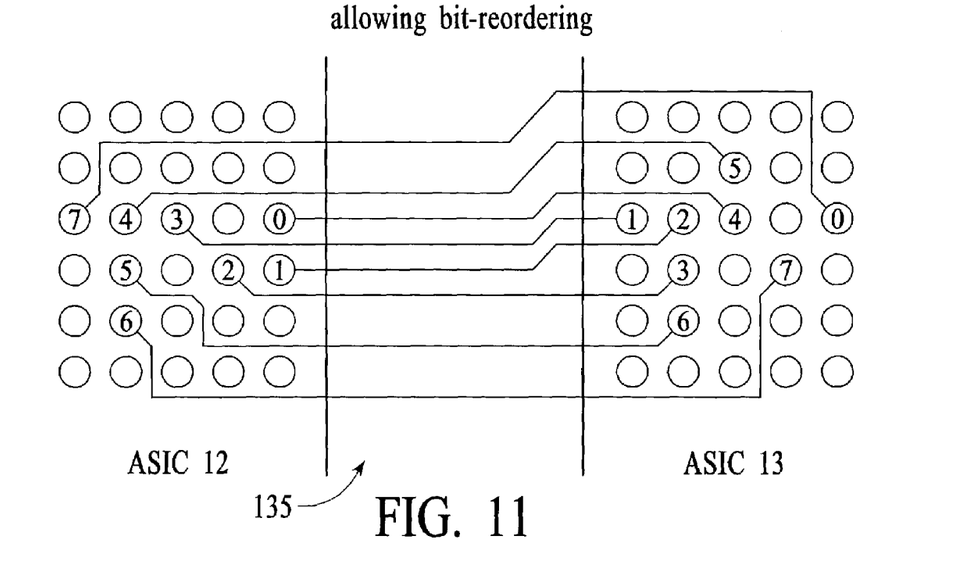
FIG. 11 illustrates signal traces connecting two ASICs according to an embodiment in which "bit-lane reordering" is allowed.

FIG. 11 illustrates signal traces 135 connecting two ASICs 12 and 13 according to an embodiment of the invention in which "bit-lane reordering" is allowed. As shown, output pins of the transmitter interface of the ASIC 12 do not have to be connected to corresponding input pins of the receiver interface of the ASIC 13. The appropriate mapping of the bit-lanes is performed by HSI Rx Controller 124. In comparison to the embodiment of FIG. 10, less board space and routing resources are needed. Signal strength is less prone to degradation because a single routing layer can be used without requiring vias.

Figure 12:
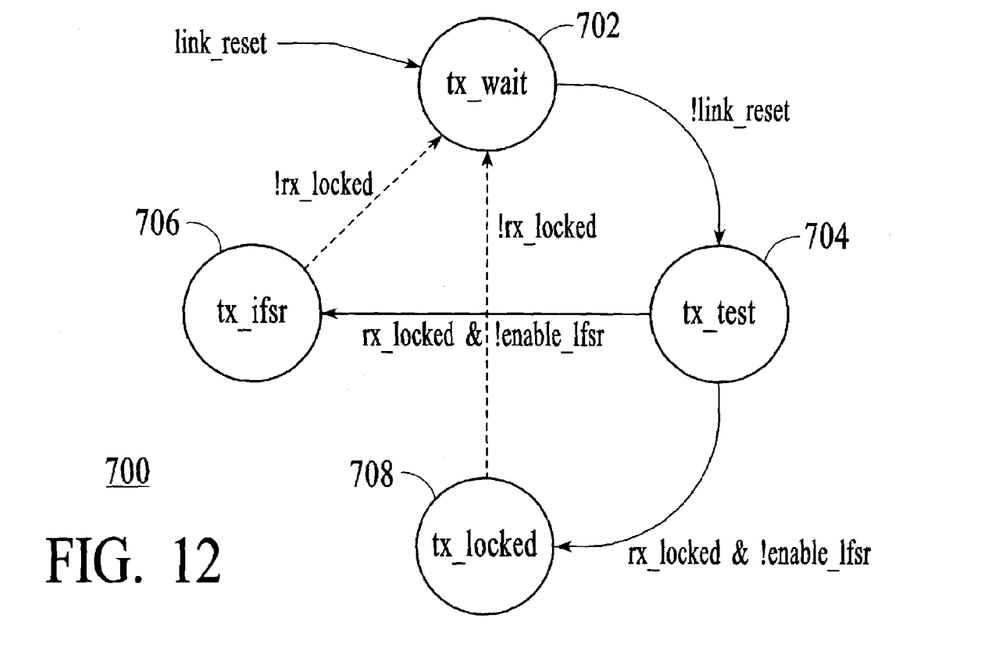
FIG. 12 is a state transition diagram for the HSI Tx Controller of FIG. 1, in accordance with one embodiment of the invention.

Attention now turns to implementation of the HSI Tx Controller 112 and the HSI Rx Controller 124. FIG. 12 is a state transition diagram 700 for the HSI Tx Controller 112 in accordance with one embodiment of the invention. As shown, the state machine of the HSI Tx Controller 112 has four states: tx_wait state 702, tx_test state 704, tx_lfsr state 706, and tx_locked state 708. Upon receiving a link_reset signal the HSI Tx Controller 112 enters the tx_wait state 702. When the link_reset signal is de-asserted, the HSI Tx Controller 112 enters the tx_test state 704. In one embodiment, the link_reset signal is generated by logic circuits of the HSI Tx Controller 112 when the HSI Rx Controller 124 de-asserts the rx_locked signal.

Figure 14:
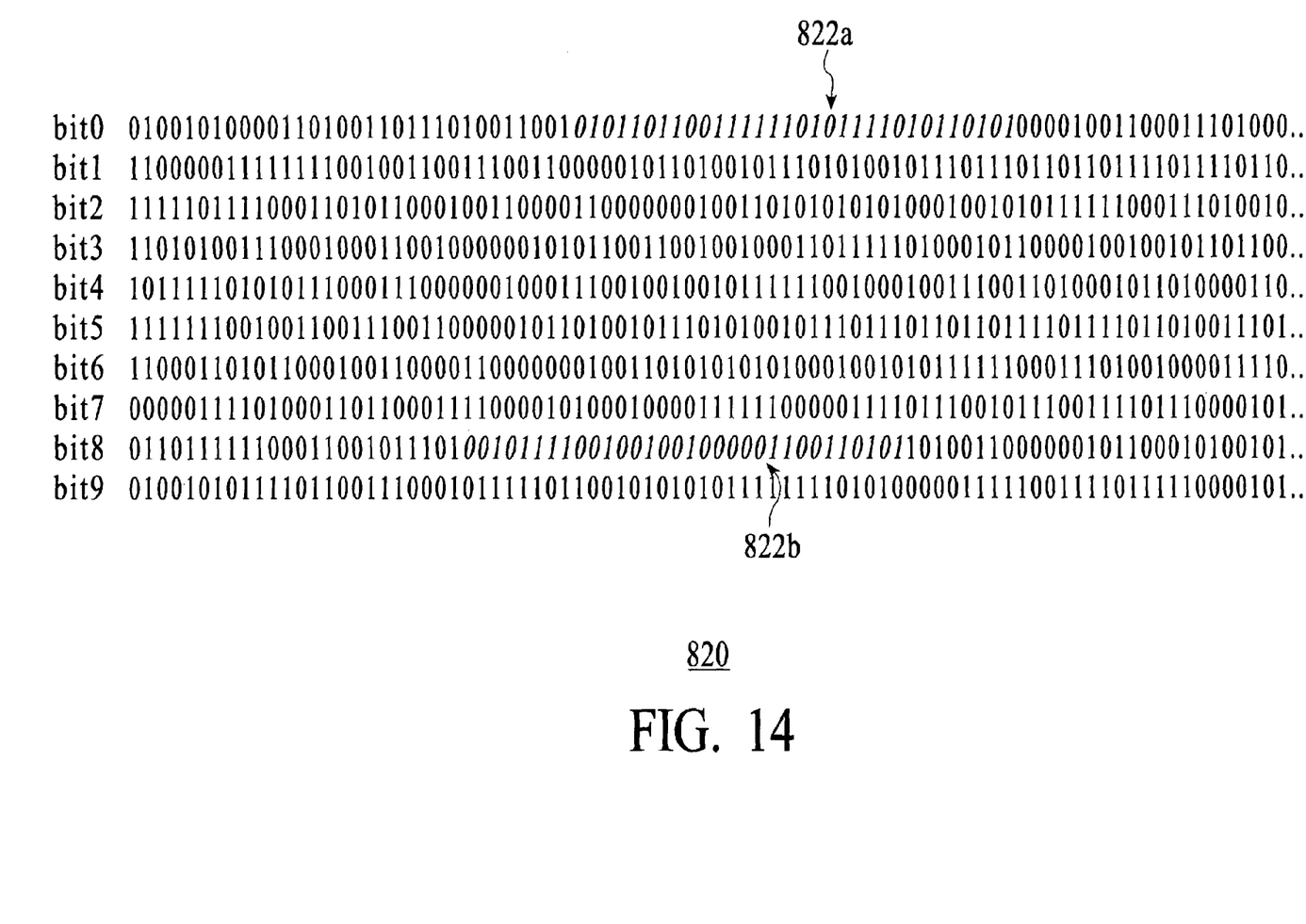
FIG. 14 illustrates part of a sample CRC test pattern generated by the HSI Tx Controller of FIG. 1, in accordance with one embodiment of the invention.

When the HSI Tx Controller 112 is in the tx_test state 704, it performs the following functions:

The HSI Tx Controller 112 generates a predetermined CRC (Cyclic Redundancy Check) test pattern. In one embodiment, the CRC test pattern is 204 symbols long, and is used by the HSI Rx Controller 124 for detecting the routing correspondence and the phase relationship between the transmit clock and the internal clock(s) of the receiver 120. Part of a sample CRC pattern 820 generated by the HSI Tx Controller 112 is shown in FIG. 14.

The HSI Tx Controller 112 drives the link with the CRC test pattern continuously. According to the present embodiment, if the receiver 120 after unscrambling the bit-lane reordering does not detect any errors after receiving the CRC test pattern for a programmable number of iterations, the receiver 120 will transmit a rx_locked signal back to the HSI Tx Controller 112 via signal line 102 (FIG. 1).

When the HSI Tx Controller 112 receives the rx_locked signal from the receiver 120, it will enter either the tx_lfsr state 706 or tx_locked state 708, depending on whether a local configuration bit is set.

In the tx_lfsr state 706, the HSI Tx Controller 112 performs the following functions:

The HSI Tx Controller 112 signals its acceptance of the receiver 120's lock indication by terminating the CRC test pattern with four continuous symbols of all 1's.

The HSI Tx Controller 112 drives the link with a data pattern derived from a predetermined 32-bit LFSR (Linear-Feedback Shift Register). In one embodiment, the LFSR pattern is chosen to provide worst case symbol transitions as a manufacturing and diagnostic aid.

If the receiver 120 de-asserts the rx_locked signal, the HSI Tx Controller 112 returns to the tx_wait state 702.

In the tx_locked state 708, the HSI Tx Controller 112 performs the following functions:

The HSI Tx Controller 112 signals its acceptance of the receiver 120's lock indication by terminating the CRC test pattern with four continuous symbols of all 0's.

When in the tx_locked state 708, the HSI Tx Controller 112 will pass any data presented to it by user logic circuits of the transmitter 110 to the HSI Tx Interface Circuit 114 for transmission to the receiver 120.

If the receiver 120 de-asserts the rx_locked signal, the HSI Tx Controller 112 returns to the tx_wait state 702.

According to one embodiment of the invention, during any one of the states, the HSI Tx Controller 112 may reset the link. In this embodiment, the HSI Tx Controller 112 has a circuit for disabling the bus clock upon receiving appropriate control signals. The receiver 120, upon failing to receive the bus clock signal, will restart the reset sequence by de-asserting the rx_locked signal to the HSI Tx Controller 112.

Figure 13:
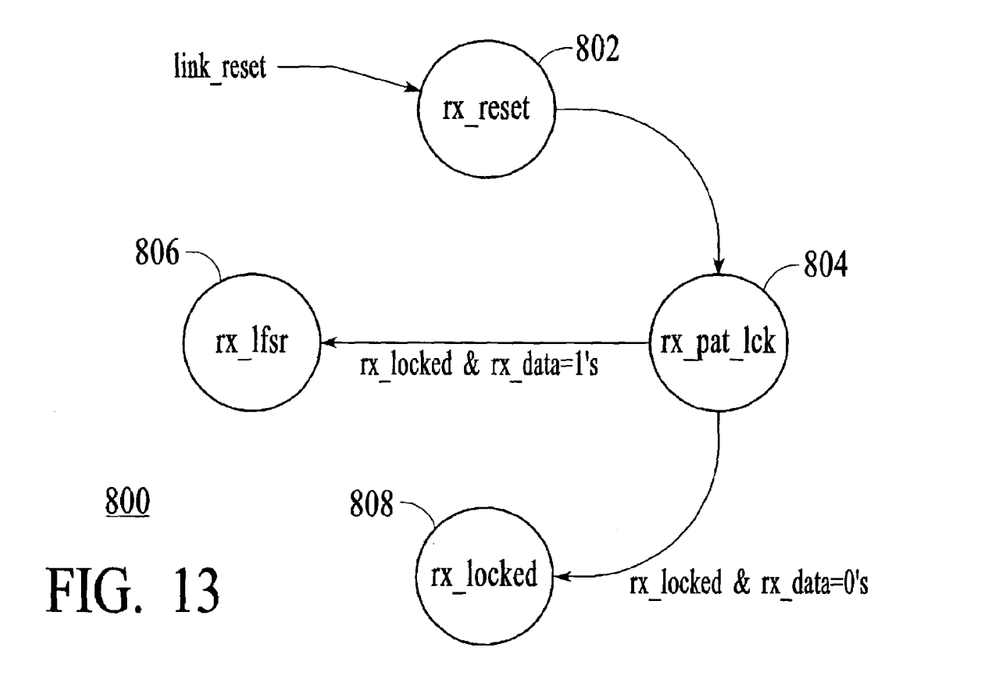
FIG. 13 is a state transition diagram for the HSI Rx Controller of FIG. 1, in accordance with one embodiment of the invention.

FIG. 13 is a state transition diagram 800 for the HSI Rx Controller 124 in accordance with one embodiment of the invention. As shown, the state transition diagram 800 has four states: rx_reset state 802, rx_pat_lck state 804, rx_lfsr state 806, and rx_locked state 808. Upon receiving a link_reset signal from user logic of the receiver 120, the HSI Rx Controller 124 enters the rx_reset state 802. When the link_reset signal is de-asserted, the HSI Rx Controller 124 enters the rx_pat_lck state 804.

When the HSI Rx Controller 124 is in the rx_pat_lck state 804, the HSI Tx Controller 112 will be in a tx_test state 704. In the rx_pat_lck state 804, the HSI Rx Controller 124 performs the following functions:

The HSI Rx Controller 124 scans each individual "bit-lanes" looking for unique bit-lane specific signatures. In one embodiment, the CRC test pattern is 204 symbols long, and part of a sample of which is shown in FIG. 14. Also shown in FIG. 14 are some of the unique data stream "signatures" 822*a*–822*b* that the HSI Rx Controller 124 looks for when determining the bit-lane correspondences. For instance, the signature 822*a* indicates the bit-lane is associated with a bit0 output of transmitter 110, and the signature 822*b* indicates that the bit-lane is associated with a bit8 output of the transmitter 110.

After the bit-lanes have been learned, the HSI Rx Controller 124 compares the received data with a locally generated CRC test pattern. When no errors have been found after one or more iterations, the HSI Rx Controller 124 transmits an asserted rx_locked signal to the transmitter 110. The HSI Rx Controller 124 then waits for a response from the HSI Tx Controller 112.

If the HSI Tx Controller 112 responds to the rx_locked signal by terminating the CRC pattern with a predetermined consecutive sequence of 1's, then the HSI Rx Controller 124 enters the rx_lfsr state 806.

If the HSI Tx Controller 112 responds to the rx_locked signal by terminating the CRC pattern with a predetermined consecutive sequence 0's, then the HSI Rx Controller 124 enters the rx_locked state 808.

In the rx_lfsr state 806, the HSI Rx Controller 124 performs the following functions:

The HSI Rx Controller 124 resets a local LFSR (Linear Feedback Shift Register) and starts generating an LFSR pattern.

The HSI Rx Controller 124 compares the locally generated LFSR pattern against the incoming data. If the incoming data and the locally generated pattern differ, then a link transmission error has occurred. In on embodiment of the invention, HSI Rx Controller 124 counts the errors and provides a bit-mask for debugging.

In one embodiment, the HSI Rx Controller 124 calculates a transmission error rate based on the number of errors occurred and the number of bits transferred. If the transmission error rate is higher than a predetermined threshold, the HSI Rx Controller 124 generates an error message for the user logic of the receiver 120.

In the rx_locked state 808, the HSI Tx Controller simply passes any incoming data to the user logic of the receiver 120.

According to the invention, the link 100 can be used to transport cell-based data as well as free flowing data streams described above. In an embodiment where cell-based data is transported, an interface is provided for the HSI Tx Controller 112 and the HSI Rx Controller 124 for supporting cells of 68 (or 72) symbols in a cell-based transport mode. If the cell-based transport mode is desired, then the interface provides the HSI Tx Controller 112 a cell framing pulse once every seventeen transmitter clock cycles. In this embodiment, since the symbol rate is four times the frequency of the transmitter clock cycle, one cell framing pulse will be sent every 68 (or 72) symbols.

Furthermore, the CRC pattern is 204 symbols long, which is equivalent to three 68 symbol frames aligned to the framing pulse. During the rx_pat_lck state, the starting point and ending point of a cell are recovered at the receiver 120 and are used to initialize a seventeen cycle counter which will continue to indicate which data word is aligned with the framing pulse after transition to the rx_locked state. This framing information is provided to user logic 105 so it can correctly know the cell positions within the data streams.

Although specific embodiments of the invention have been described and illustrated, the invention is not to be limited to the specific forms or arrangements of parts as described and illustrated herein. The invention is limited only by the claims.

What is claimed is:

1. A system, comprising:
an interconnect bus having a plurality of single-ended signal traces;
a first integrated circuit having logic circuits operable synchronously with a system clock signal, and a transmitter interface circuit that is coupled to the interconnect bus;
a second integrated circuit having logic circuits operable synchronously with the system clock signal, and a receiver interface circuit that is coupled to the transmitter interface circuit through the interconnect bus, wherein the transmitter interface circuit generates a bus clock signal and transmits data synchronously with transitions of the bus clock signal to the receiver circuit via the single-ended signal traces at full swing, and wherein the bus clock signal is at least twice a frequency of the system clock signal.

2. The system of claim 1, wherein the transmitter interface circuit generates data signals having a full swing amplitude of approximately 1.8V.

3. The system of claim 2, wherein the transmitter interface circuit generates a bus clock signal having a frequency of approximately 333 MHz.

4. The system of claim 3, wherein the transmitter interface circuit comprises a plurality of CMOS output drivers coupled to individual ones of the plurality of signal traces of the interconnect bus.

5. The system of claim 4, wherein the plurality of CMOS output drivers each have an impedance matching that of individual ones of the signal traces.

6. The system of claim 3, wherein the transmitter interface circuit receives 32-bit data from the transmitter interface circuit synchronously with the system clock and transmits 8-bit data to the interconnect bus synchronously with rising transitions and falling transitions of the bus clock signal.

7. The system of claim 6, wherein the receiver interface circuit receives the bus clock signal and 8-bit data from the interconnect bus, converts the received 8-bit data into 32-bit data, and provides the 32-bit data to the receiver controller circuit synchronously with the system clock signal.

8. The system of claim 3, wherein the transmitter interface circuit receives 40-bit data from the transmitter controller circuit synchronously with the system clock and transmits 10-bit data to the interconnect bus synchronously with rising transitions and falling transitions of the bus clock signal.

9. The system of claim 8, wherein the receiver interface circuit receives the bus clock signal and 10-bit data from the interconnect bus, converts the received 10-bit data into 40-bit data, and provides the 40-bit data to the receiver controller circuit synchronously with the system clock signal.

10. The system of claim 3, wherein the transmitter interface circuit and the receiver interface circuit consumes approximately 0.30 W for transferring 13 Gbit of data per second.

11. The system of claim 1, further comprising a clock signal trace coupling the transmitter interface circuit and the receiver interface circuit to transmit the bus clock signal.

12. The system of claim 11, wherein the plurality of signal traces are length-matched and wherein the clock signal trace is longer than said plurality of signal traces.

13. An integrated circuit, comprising:
logic circuits synchronous with a first clock signal; and
a transmitter interface circuit configured to couple to single-ended signal traces of an interconnect bus, to generate a bus clock signal and to transmit data to another integrated circuit via the interconnect bus at full swing synchronously with rising and falling transitions of the bus clock signal, and wherein the bus clock signal is at least twice a frequency of the first clock signal.

14. The integrated circuit of claim 13, wherein the transmitter interface circuit is configured to generate data signals having a full swing amplitude of approximately 1.8V.

15. The system of claim 13, wherein transmitter interface circuit is configured to generate a bus clock signal of approximately 333 MHz.

16. The integrated circuit of claim 13, wherein the transmitter interface circuit comprises a plurality of CMOS output drivers configured to couple to individual signal traces of the interconnect bus.

17. The integrated circuit of claim 16, wherein the plurality of CMOS output drivers each have an impedance matching that of the individual signal traces.

18. The integrated circuit of claim 13, wherein the transmitter interface circuit is configured to receive 32-bit data synchronously with the first clock signal and to transmit 8-bit data to the interconnect bus synchronously with rising transitions and falling transitions of the bus clock signal.

19. The integrated circuit of claim 13, wherein the transmitter interface circuit is configured to receive 40-bit data synchronously with the first clock signal and to transmit 10-bit data to the interconnect bus synchronously with rising transitions and falling transitions of the bus clock signal.

20. An integrated circuit, comprising:
logic circuits synchronous with a first clock signal; and
a receiver interface circuit configured to couple to single-ended signal traces of an interconnect bus to receive data transmitted at full swing synchronously with transitions of a bus clock signal, the receiver interface circuit configured to synchronize the received data with the first clock signal, wherein a frequency of the bus clock signal is at least twice a frequency of the first clock signal.

21. The integrated circuit of claim 20, wherein the receiver interface circuit is configured to receive data signals having a full swing amplitude of approximately 1.8V.

22. The integrated circuit of claim 20, wherein the bus clock signal has a frequency of approximately 333 MHz.

23. The integrated circuit of claim 20, wherein the receiver interface circuit comprises a plurality of CMOS input buffers coupled to individual ones of the plurality of signal traces.

24. The integrated circuit of claim 20, wherein the receiver interface circuit is configured to receive the bus clock signal and 8-bit data from the interconnect bus, convert the received 8-bit data into 32-bit data, and provide the 32-bit data to the logic circuits synchronously with the first clock signal.

25. The integrated circuit of claim 20, wherein the receiver interface circuit is configured to receive the bus clock signal and 10-bit data from the interconnect bus, convert the received 10-bit data into 40-bit data, and provide the 40-bit data to the logic circuits synchronously with the first clock signal.

* * * * *